United States Patent
Kennedy et al.

(10) Patent No.: US 9,043,522 B2
(45) Date of Patent: May 26, 2015

(54) HANDLING INTERRUPTS IN A MULTI-PROCESSOR SYSTEM

(71) Applicant: ARM LIMITED, Cambridge (GB)

(72) Inventors: Michael Alexander Kennedy, Cambridge (GB); Anthony Jebson, Cambridge (GB)

(73) Assignee: ARM Limited, Cambridge (GB)

( * ) Notice: Subject to any disclaimer, the term of this patent is extended or adjusted under 35 U.S.C. 154(b) by 241 days.

(21) Appl. No.: 13/653,472

(22) Filed: Oct. 17, 2012

(65) Prior Publication Data

US 2014/0108691 A1    Apr. 17, 2014

(51) Int. Cl.
  *G06F 13/24* (2006.01)
  *G06F 9/48* (2006.01)
  *G06F 9/50* (2006.01)

(52) U.S. Cl.
  CPC .............. *G06F 13/24* (2013.01); *G06F 9/4812* (2013.01); *G06F 9/5027* (2013.01)

(58) Field of Classification Search
  CPC ......... G06F 13/24; G06F 9/48; G06F 9/4806; G06F 9/4812; G06F 9/50; G06F 9/5005; G06F 9/5027
  USPC .............................. 710/260–269; 712/28–30; 718/102–103, 105, 107, 108
  See application file for complete search history.

(56) References Cited

U.S. PATENT DOCUMENTS

| | | | | |
|---|---|---|---|---|
| 2005/0080969 | A1* | 4/2005 | Arndt | 710/260 |
| 2007/0043970 | A1* | 2/2007 | Solomita et al. | 714/10 |
| 2009/0228625 | A1* | 9/2009 | Kulkarni | 710/263 |
| 2009/0248934 | A1* | 10/2009 | Ge et al. | 710/261 |
| 2010/0262742 | A1* | 10/2010 | Wolfe | 710/265 |
| 2011/0040914 | A1* | 2/2011 | Strauss et al. | 710/267 |
| 2011/0202699 | A1* | 8/2011 | van Riel | 710/267 |
| 2012/0110388 | A1* | 5/2012 | Lavery | 714/47.1 |
| 2014/0047151 | A1* | 2/2014 | Feehrer et al. | 710/267 |

OTHER PUBLICATIONS

ARM Generic Interrupt Controller, Architecture version 2.0, *ARM Limited*, 2011, 212 pages.
Cantoni, "A Technique for Interrupt Distribution in a Multiprocessor System", *Software & Microsystems*, vol. 1, No. 6, Oct. 1982, p. 153.
Gountanis et al., "A Method of Processor Selection for Interrupt Handling in a Multiprocessor System", *Proceedings of the IEEE*, vol. 54, No. 12, Dec. 1966, p. 1812.

(Continued)

*Primary Examiner* — Thomas J Cleary
(74) *Attorney, Agent, or Firm* — Nixon & Vanderhye P.C.

(57) ABSTRACT

A data processing apparatus has a plurality of processors and a plurality of interrupt interfaces each for handling interrupt requests from a corresponding processor. An interrupt distributor controls routing of interrupt requests to the interrupt interfaces. A shared interrupt request is serviceable by multiple processors. In response to the shared interrupt request, a target interrupt interface issues an interrupt ownership request to the interrupt distributor, without passing the shared interrupt request to the corresponding processor, if it estimates that the corresponding processor is available for servicing the shared interrupt request. The shared interrupt request is passed to the corresponding processor when an ownership confirmation is received from the interrupt distributor indicating that the processor has been selected for servicing the shared interrupt request.

18 Claims, 9 Drawing Sheets

(56) References Cited

OTHER PUBLICATIONS van der Wal et al., "Efficient Interprocessor Communication in a Tightly-coupled Homogeneous Multiprocessor System", *Distributed Computing Systems*, 1990 Proceedings, Second IEEE Workshop on Future Trends of, pp. 362-368.

Kirrmann, "Events and Interrupts in Tightly Coupled Microprocessor", *Micro*, IEEE, vol. 5, No. 1, 1985, p. 53.

Brandenburg et al., "Accounting for Interrupts in Multiprocessor Real-Time Systems", *RTCSA '09 Proceedings of the 2009 15th IEEE International Conference on Embedded and Real-Time Computing Systems and Applications*, 2009, pp. 273-283.

\* cited by examiner

HANDLING INTERRUPTS IN A MULTI-PROCESSOR SYSTEM

BACKGROUND OF THE INVENTION

1. Field of the Invention

The present application relates to the field of data processing. More particularly, the invention relates to handling interrupts in a data processing apparatus having multiple processors.

2. Description of the Prior Art

In a data processing apparatus, interrupt requests are used to signal to a processor that it should interrupt its current processing and execute an interrupt handling routine. For example, interrupts may be used to signal errors or to notify the processor of an event occurring at a peripheral device. In a multi-processor system, it is often desirable for only one processor to actually service an interrupt request, even if more than one processor could service the interrupt request. The present technique seeks to improve the way in which one of multiple available processors is selected for handling an interrupt request.

SUMMARY OF THE INVENTION

Viewed from one aspect, the present invention provides a data processing apparatus comprising:

a plurality of processors;

a plurality of interrupt interfaces each configured to handle interrupt requests for a corresponding processor; and an interrupt distributor configured to control routing of the interrupt requests to the plurality of interrupt interfaces for the corresponding processors, the interrupt requests including a shared interrupt request which is serviceable by multiple processors;

wherein in response to the shared interrupt request, a target interrupt interface corresponding to one of the multiple processors is configured to issue an interrupt ownership request to the interrupt distributor, without passing the shared interrupt request to the corresponding processor, if the target interrupt interface estimates that the corresponding processor is available for servicing the shared interrupt request; and the target interrupt interface is configured to pass the shared interrupt request to the corresponding processor in response to an ownership confirmation from the interrupt distributor indicating that the corresponding processor has been selected for servicing the shared interrupt request.

In a data processing apparatus having multiple processors, a plurality of interrupt interfaces may be provided, each for handling interrupt requests for a corresponding processor. An interrupt distributor may control routing of the interrupt request to the interrupt interfaces for the corresponding processors. The interrupt requests include a shared interrupt request which is serviceable by multiple processors. By allowing the shared interrupt request to be serviced by any of multiple processors, the shared interrupt request may often be serviced more quickly than an interrupt request which targets a specific processor. An interrupt interface which receives a shared interrupt request may be referred to as a "target interrupt interface".

The inventors of the present technique recognised that determining which of multiple processors should service a shared interrupt request can take some time, which could delay processing by the processors. Typically, in order to find out whether a processor is available for handling an interrupt, the interrupt would be passed to the processor, which would respond if it is available. However, the inventors realised that if the shared interrupt request was issued to all, or a subset, of the multiple processors in order to find out which processors are available, then the processors could suspend processing in response to the interrupt. This can lead to the processors remaining idle during a period between receiving the interrupt request and it being determined which processor should service the interrupt. Since all but one of the processors would not be selected to service the interrupt, then halting processing at each processor can cause a significant loss of performance.

To address this issue, in the present technique the shared interrupt request is not passed to the corresponding processor when it is received by a target interrupt interface. Instead, the target interrupt interface estimates whether the corresponding processor is available for servicing the shared interrupt request, without passing the shared interrupt request to the corresponding processor. If it is estimated that the corresponding processor is available for servicing the shared interrupt request, then the target interrupt interface issues an interrupt ownership request to the interrupt distributor. When an ownership confirmation is received from the interrupt distributor indicating that the processor corresponding to the target interface has been selected for servicing the shared interrupt request, then the target interrupt interface passes the shared interrupt request to the corresponding processor. Since the shared interrupt request is not passed to the processor until the processor has already been selected for servicing the shared interrupt request, the processor can continue to perform its current processing during the period when ownership of the interrupt is being determined This is possible because the target interrupt interface makes an estimation of whether the processor is available for servicing without actually issuing the interrupt to the processor.

The processors may comprise any destination which is capable of servicing an interrupt request. For example, the processors may comprise central processing units (CPUs) or graphic processing units (GPUs). Also, a processor may comprise a cluster of processing units.

The shared interrupt request may be distributed from the interrupt distributor to the interrupt interfaces in different ways. In one example, the interrupt interfaces may periodically poll the interrupt distributor to check whether a shared interrupt request has been received. However, it may be preferable for the interrupt distributor to route a received shared interrupt request to the target interrupt interfaces corresponding to at least some of the processors which are eligible for servicing the shared interrupt request. In response to receiving the shared interrupt request from the interrupt distributor, each target interrupt interface may estimate whether the corresponding processor is available for servicing the shared interrupt request, and if so, to issue the interrupt ownership request to the interrupt distributor.

The interrupt interfaces may be implemented in different ways. In one example, each interrupt interface may be part of the corresponding processor. In another example, an interrupt controller may comprise the interrupt distributor and the interrupt interfaces, with the interrupt interfaces being separate from the corresponding processors.

The interrupt distributor may receive one or more interrupt ownership requests from different target interrupt interfaces indicating that the corresponding processors are estimated to be available for servicing the shared interrupt request. In response, the interrupt distributor may select a target interrupt interface from which an interrupt ownership request has been received and issue an ownership confirmation to the selected target interrupt interface. The selection may be performed in various ways. To allow the shared interrupt request to be handled as quickly as possible, the interrupt distributor may select the target interrupt interface from which the first interrupt ownership request is received. However, other selection schemes could also be used.

If interrupt ownership requests are received from more than one target interrupt interface, then the interrupt distributor may issue an ownership rejection to at least one non-selected target interrupt interface indicating that the corresponding processor has not been selected for servicing the shared interrupt request. The ownership rejection need not be issued immediately. For example, deferring at least some ownership rejections may be useful so that if the processor corresponding to the selected target interrupt interface is not able to handle the shared interrupt signal, then the shared interrupt request can instead by handled by another processor corresponding to a target interrupt interface for which an ownership rejection has not yet been sent. For example, the ownership rejection may be issued once the interrupt has been acknowledged by a processor, indicating that the interrupt is being serviced.

In response to receiving an ownership rejection, a non-selected target interrupt interface may prevent the shared interrupt request being passed to the corresponding processor. This means that processors which are not selected for servicing the interrupt will not receive the shared interrupt request and so do not halt their current processing. By avoiding unnecessary interruptions to data processing, this helps to improve the processing performance of the data processing apparatus. In contrast, if the shared interrupt request had been passed to all the candidate processors before determining which processor should service the interrupt request, then the non-selected processors would unnecessarily have been interrupted.

The target interrupt interface may estimate whether the corresponding processor is available for servicing the shared interrupt request without checking with the corresponding processor whether it is actually available for servicing the shared interrupt request. Checking whether the processor is actually available for servicing the interrupt would often require the processor to interrupt its current processing and so avoiding this check can help to improve processing performance.

The target interrupt interface may be provided with access to a subset of processor state of the corresponding processor, and may estimate, based on the subset of processor state, whether the corresponding processor is available for servicing the shared interrupt request. The subset of processor state does not need to provide a completely accurate indication of whether the processor is available.

For example, the subset of processor state may include at least one of:

A current priority level of a task or interrupt being processed by the corresponding processor. If the shared interrupt request has a lower priority than, or the same priority as, the current task or interrupt, then the shared interrupt request would not pre-empt the current processing of the processor, and so it can be estimated that the processor would not be available for servicing the interrupt.

A priority mask level, wherein interrupt requests having a lower priority than the priority mask level cannot be serviced by the corresponding processor (optionally, interrupt requests having the same priority as the priority mask level could also be prevented from being serviced). Hence, if the shared interrupt request has a lower priority than (or the same priority as) the priority mask level then it may be estimated that the interrupt request cannot be serviced by the processor.

An indication of whether interrupts are masked by the corresponding processor. The processor may sometimes mask interrupts to prevent it from being interrupted during its current processing. If interrupts are currently masked, then the processor may be estimated not to be available for handling the shared interrupt request.

An indication of whether at least one group of interrupts are enabled or disabled by the corresponding processor. The processor may disable certain groups of interrupts, and so if the shared interrupt request is one of a disabled group of interrupts then the interrupt interface can estimate that the processor is not available for servicing the shared interrupt request.

A current execution mode of the corresponding processor. For example, sometimes the processor may be in a secure execution mode in which servicing of certain kinds of interrupts is inappropriate. If the current execution mode is such that the shared interrupt request cannot be serviced, then it is estimated that the corresponding processor is not available for servicing the interrupt.

The number of interrupts of a higher priority active for the corresponding processor. If many higher priority interrupts are active, then it can be estimated that the processor will be unlikely to be available for servicing the interrupt.

Hence, the target interrupt interface may have access to various processor state which can indicate that the corresponding processor cannot service the interrupt. If the subset of processor state does not indicate that the processor cannot service the interrupts, then the interrupt ownership request may be issued. That is, the interrupt interface assumes that, unless there is something in the processor state that rules out handling of the shared interrupt request, then the processor is likely to be available for servicing a request, and so speculatively issues an interrupt ownership request in this case.

Nevertheless, even if the processor state does not rule out servicing the interrupt, the processor may still be unavailable for handling the interrupt request. For example, the processor may have reached a stage of execution at which it cannot halt processing to service the interrupts. Alternatively, the processor may be in a condition, of which the interrupt interface is not aware, which means that the processor cannot service the shared interrupt request. Therefore, the estimation of the target interrupt interface may be incorrect, and so once a processor has been selected for servicing the interrupts, the processor may find that it cannot service the interrupt. Also, even if the prediction of processor availability by the target interrupt interface is initially correct, it is possible that the processor state may then change so that, by the time the processor is passed the interrupt, the processor cannot handle the interrupt anymore.

To address this issue, the target interface may provide an ownership release indication to the interrupt distributor if, after passing the shared interrupt request to the corresponding processor, the corresponding processor cannot service the shared interrupt request. This enables the processor to relinquish ownership of the shared interrupt request to allow other processors to service the interrupt if possible.

In response to the ownership release indication, the interrupt distributor can allow another processor to service the shared interrupt request. This can be done in various ways. In one example, the interrupt distributor may simply re-issue the shared interrupt request to trigger fresh interrupt ownership requests from any target interrupt interfaces which estimate that the corresponding processor is available. Optionally, the re-issued shared interrupt request may be issued to just a subset of the target interrupt interfaces to which the original shared interrupt request was issued. For example, target interrupt interfaces which did not issue an interrupt ownership request, or the target interrupt interface which provided the ownership release indication, may be excluded from receiving the re-issued shared interrupt request, as it may be assumed that the processors corresponding to these target interrupt interfaces still cannot service the interrupt. Alternatively, it may be simpler for the re-issued shared interrupt request to be routed to all target interrupt interfaces. Another way of allowing other processors to service the shared interrupt request is for the interrupt distributor to defer issuing the ownership rejection to at least one non-selected target interrupt interface when making the initial ownership selection, and, when the ownership release indication is received from the previously selected target interrupt interface, to issue an ownership confirmation to a target interrupt interface for which no ownership rejection has yet been sent. In another example, if a shared interrupt request targets a subset of the processors, and one of the processors releases ownership of the shared interrupt request while none of the other processors in the subset has requested ownership, then the interrupt distributor could re-issue the shared interrupt request to a different subset of the processors.

There are different ways in which the target interrupt interface may determine whether the processor can service the shared interrupt request. For example, if, after passing the shared interrupt request to the corresponding processor, the corresponding processor has not serviced the shared interrupt request within a predetermined time, then the target interrupt interface may assume that the processor cannot service the shared interrupt request and may issue the ownership release indication.

Also, if the corresponding processor enters an interrupt service routine corresponding to the shared interrupt signal and exits the interrupt service routine without servicing the shared interrupt request, then again it may be assumed that the corresponding processor cannot service the interrupt and the ownership release indication may be issued.

If it is found that the selected processor cannot service the shared interrupt request, but the corresponding target interrupt interface was the only interrupt interface to have issued an interrupt ownership request, then issuing an ownership release indication may not be useful since there would not be any other processors which are estimated to be available for servicing of the interrupt. Therefore, in such a situation it may be better to wait for the selected processor to become available. To achieve this, the interrupt distributor may indicate to the target interrupt interface whether the target interrupt interface is the only interface to have issued an interrupt ownership request in response to the shared interrupt request. If the target interrupt interface is the only interrupt interface to have issued an interrupt ownership request, then issuing of the ownership release indication may be suppressed by the target interrupt interface. In this case, the interrupt may simply remain pending at the selected processor until the processor does become available for handling the interrupt. This avoids extra processing at the interrupt distributor and at other target interrupt interfaces for handling the ownership release indication.

There may be different ways in which the processor can indicate to the interrupt interface whether it is available for servicing the shared interrupt request after it has been passed to the processor. In one example, the interrupt interface may comprise an interrupt knowledge register which stores interrupt identifying data relating to the shared interrupt request passed to the corresponding processor. When the processor receives the shared interrupt request, then the processor may read the interrupt identifying data from the interrupt acknowledge register if the processor is available for servicing the interrupt. The target interrupt interface can assume that the processor is not available for servicing the interrupt if the processor does not read the interrupt acknowledge register. The interrupt identifying data may be any data relating to the interrupt. In some examples, the interrupt identifying data may comprise just an identifier which indicates the highest priority interrupt which is pending for the corresponding processor. In other examples, additional data may also be provided in the interrupt acknowledge register.

Viewed from another aspect, the present invention provides a computer-readable storage medium storing a computer program which, when executed on a computer, causes the computer to act as a virtual machine corresponding to the data processing apparatus described above. The virtual machine enables the computer to act as if it has the features of the data processing apparatus and allows the computer to execute instructions and handle interrupts in an environment corresponding to the data processing apparatus. The storage medium may, for example, be a non-transitory computer-readable storage medium.

Viewed from another aspect, the present invention provides a data processing apparatus comprising:

a plurality of processing means for processing data;

a plurality of interrupt interface means for handling interrupt requests for a corresponding processing means; and an interrupt distributing means for controlling routing of the interrupt requests to the plurality of interrupt interface means for the corresponding processing means, the interrupt requests including a shared interrupt request which is serviceable by multiple processing means;

wherein in response to the shared interrupt request, a target interrupt interface means corresponding to one of the multiple processing means is configured to issue an interrupt ownership request to the interrupt distributing means, without passing the shared interrupt request to the corresponding processing means, if the target interrupt interface means estimates that the corresponding processing means is available for servicing the shared interrupt request; and the target interrupt interface means is configured to pass the shared interrupt request to the corresponding processing means in response to an ownership confirmation signal from the interrupt distributing means indicating that the corresponding processing means has been selected for servicing the shared interrupt request.

Viewed from a further aspect, the present invention provides an interrupt interface for handling interrupt requests for a corresponding processor of a data processing apparatus having a plurality of processors; wherein:

in response to a shared interrupt request which is serviceable by multiple processors including the processor corresponding to the interrupt interface, the interrupt interface is configured to estimate whether the corresponding processor is available for servicing the shared interrupt request;

the interrupt interface is configured to issue an interrupt ownership request to an interrupt distributor, without passing the shared interrupt request to the corresponding processor, if the corresponding processor is estimated to be available for servicing the shared interrupt request; and in response to an ownership confirmation signal from the interrupt distributor indicating that the corresponding processor has been selected for servicing the shared interrupt request, the interrupt interface is configured to pass the shared interrupt request to the corresponding processor.

Viewed from yet another aspect, the present invention provides a method for handling interrupt requests in a data processing apparatus having a plurality of processors, the method performed by an interrupt interface corresponding to one of the plurality of processors and comprising the steps of:

receiving a shared interrupt request which is serviceable by multiple processors including the processor corresponding to the interrupt interface;

estimating whether the corresponding processor is available for servicing the shared interrupt request;

if the corresponding processor is estimated to be available for servicing the shared interrupt request, issuing an interrupt ownership request to an interrupt distributor, without passing the shared interrupt request to the corresponding processor; and in response to an ownership confirmation signal from the interrupt distributor indicating that the corresponding processor has been selected for servicing the shared interrupt request, passing the shared interrupt request to the corresponding processor.

Further particular and preferred aspects of the present invention are set out in the accompanying independent and dependent claims. Features of the dependent claims may be combined with features of the independent claims as appropriate, and in combinations other than those explicitly set out in the claims.

DESCRIPTION OF EMBODIMENTS

Figure 1:
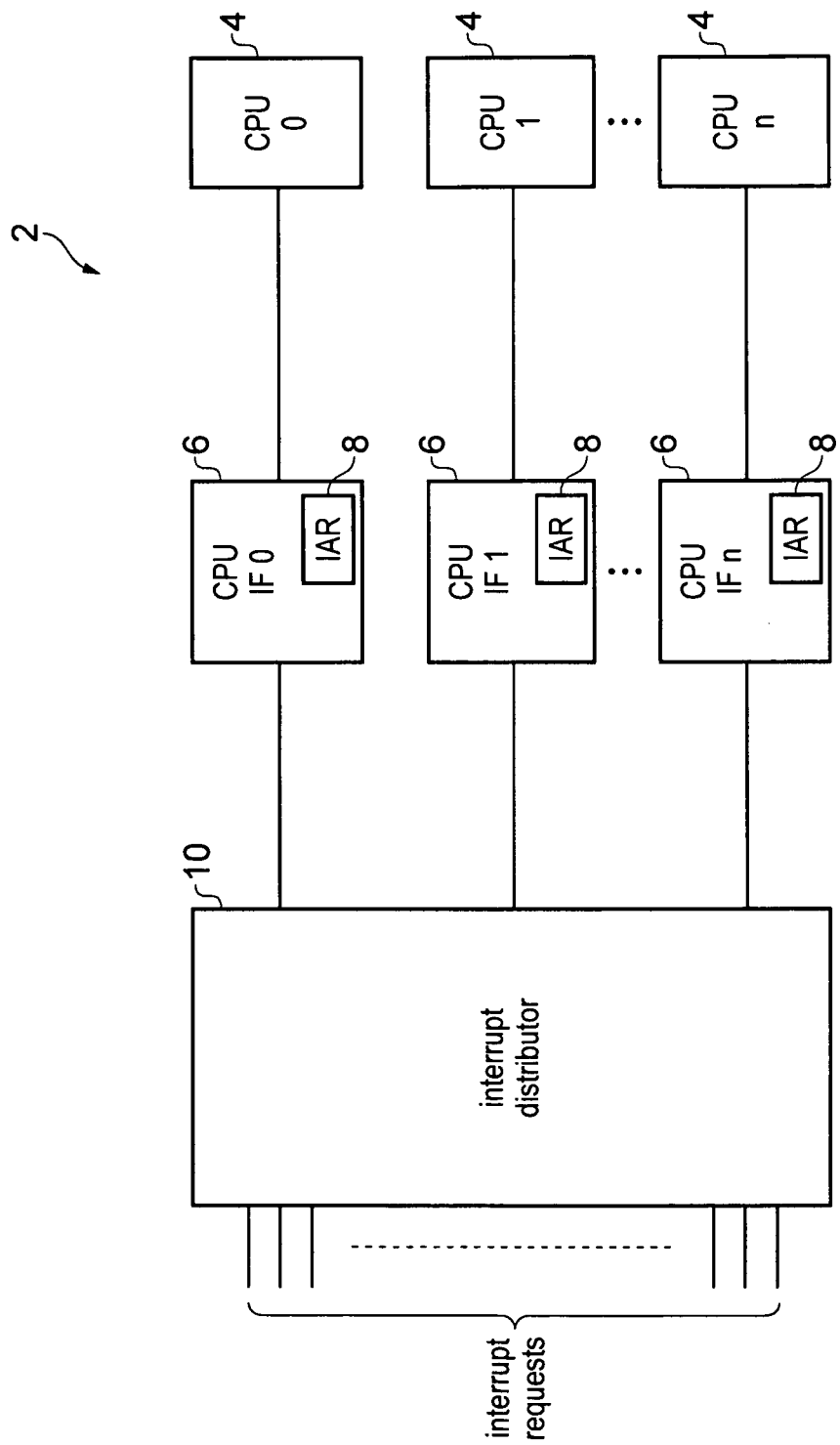
FIG. 1 schematically illustrates a data processing apparatus having multiple processors.

FIG. 1 schematically illustrates a data processing apparatus 2 comprising a plurality of processors 4. Although FIG. 1 shows three processors CPU0, CPU1, CPU2, it will be appreciated that the apparatus 2 may comprise more or fewer processors. Each processor 4 has an associated interrupt handling interface 6 for handling interrupts for the corresponding processor 4. The interrupt interface 6 has an interrupt acknowledge register 8 for storing data identifying the highest priority interrupt which has been passed to the corresponding processor 4. When an interrupt is passed to the processor 4, the processor determines whether it can service the interrupt. If the processor 4 can service the interrupt, then it reads the interrupt identifying data from the interrupt acknowledge register 8 of the corresponding interface 6. If the interrupt is still valid, then the interrupt 6 returns the interrupt identifying data, which the processor 4 can use to handle the interrupt. On the other hand, if for some reason the interrupt is no longer pending then the interface 6 may return spurious interrupt identifying data (for example, a value of the interrupt identifying data that does not correspond to any valid interrupt), to indicate to the processor 4 that it should no longer handle the interrupt. The use of an interrupt acknowledge register 8 is not essential, and there may be other ways in which the processor 4 can signal to the interrupt interface 6 that it can handle the interrupt.

An interrupt distributor 10 is provided for receiving interrupt requests from various interrupt sources and distributing the interrupt requests to the different interrupt interfaces 6 for the corresponding processors 4. The distributor 10 controls the flow of interrupts throughout the system and provides additional support for configuration and for global interrupts. Although FIG. 1 shows the interrupt interfaces 6 as being distinct from the processors 4, in some examples each interface 6 may be integrated into the corresponding processor 4. Alternatively, the interfaces 6 and interrupt distributor 10 may be combined to form an interrupt controller.

Some interrupt requests target a specific processor and can only be serviced by that processor. Such interrupt requests are routed by the distributor 10 to the interface 6 corresponding to the target processor and remain pending until the target processor has serviced the interrupt (servicing of the interrupt request may be delayed if a higher priority interrupt request targets the same processor). However, other interrupt requests are known as shared interrupt requests and may be serviced by any of several eligible processors 4 of the data processing apparatus 2. By allowing the shared interrupt request to be serviced by any of the eligible processors, it is more likely that the interrupt can be handled more quickly, since if one processor is not available for servicing interrupts then another may be available.

Figure 2:
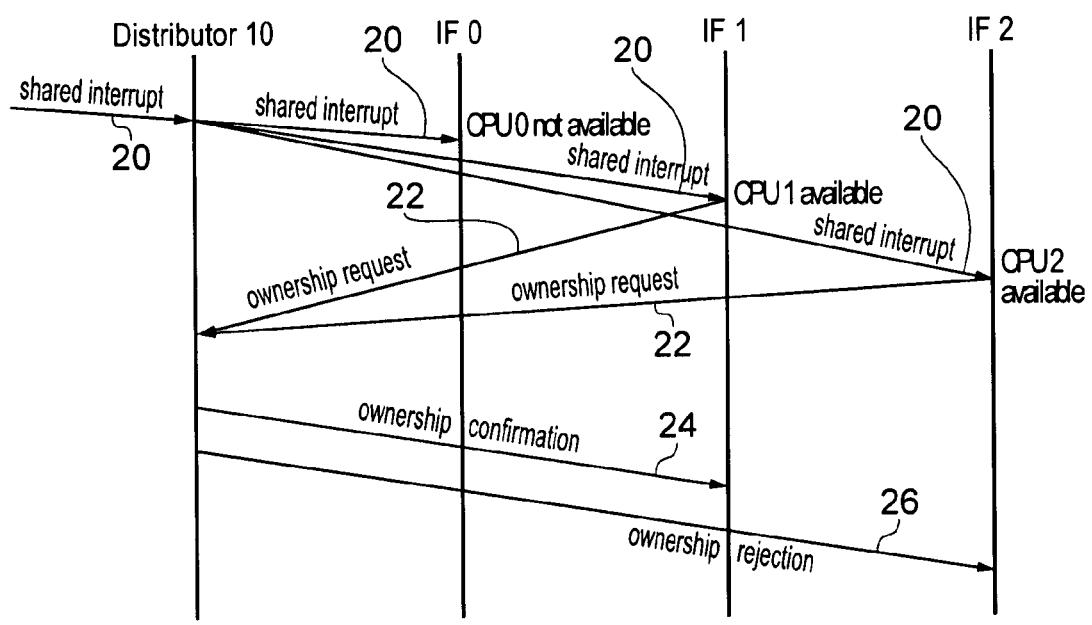
FIG. 2 schematically illustrates handling of a shared interrupt request which is serviceable by any of multiple processors.

FIG. 2 shows an example of handling shared interrupt requests. A shared interrupt request 20 is received by the distributor 10 from an interrupt source, such as a peripheral device. In response, the distributor 10 routes the shared interrupt request 20 to the interrupt interfaces 6 corresponding to several candidate processors, any of which could service the interrupt. For example, in FIG. 2 the interfaces are labelled IF0, IF1, IF2 and correspond to processors CPU0, CPU1, CPU2 respectively. The interfaces 6 which receive the shared interrupt request are referred to as "target interrupt interfaces" (there could also be one or more other interrupt interfaces 6 which do not receive the shared interrupt request).

In response to the shared interrupt request 20, each target interrupt interface 6 estimates whether the corresponding processor is available for servicing the interrupt. In this example, interface IF0 determines that processor CPU0 is not available for servicing the interrupt, and so does not issue an interrupt ownership request. On the other hand, interfaces IF1, IF2 estimate that the corresponding processors CPU1, CPU2 are available for servicing the interrupts, and so issue an interrupt ownership request 22 to the distributor 10. The distributor 10 determines, among the target interrupt interfaces 6 from which ownership requests 22 have been received, which interface 6 should handle the interrupt. In this example, the distributor 10 selects interface IF1 corresponding to processor CPU1. An ownership confirmation 24 is sent to the selected interface IF1, while an ownership rejection 26 is selected to any non-selected interfaces from which an ownership request was received.

Figure 3A:
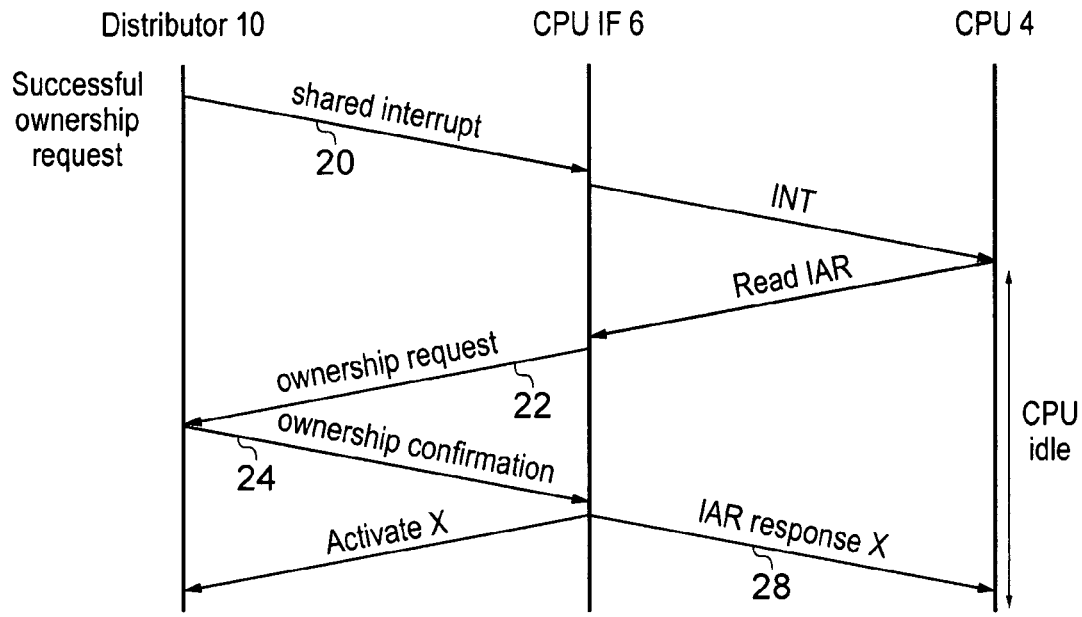
FIGS. 3A and 3B illustrate an issue which may occur if interrupts are routed to a processor before it has been determined which processor should service the interrupt.
Figure 3B:
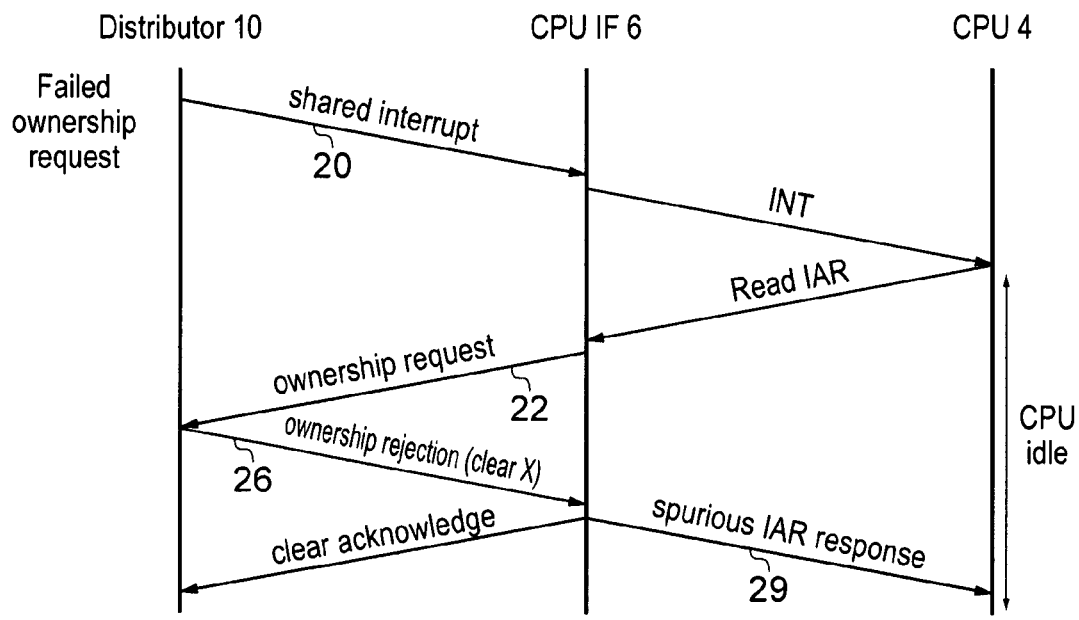

When the shared interrupt request signal is routed to several target interrupt interfaces 6 as shown in FIG. 2, it would be possible for each target interrupt interface 6 to pass the shared interrupt request to the corresponding processor 4 as soon as it is received, to allow the corresponding processor 4 to determine whether it is available to service the interrupt. However, FIGS. 3A and 3B illustrate a problem which occurs in this case. FIG. 3A shows the exchange of data between the distributor 10, a target interrupt interface 6 and the corresponding processor 4 in the case where the processor 4 is selected for servicing the interrupts, while FIG. 3B shows a similar case where the processor 4 is not selected for servicing the interrupt.

In FIG. 3A, the shared interrupt request 20 is sent from the distributor 10 to the target interrupt interface 6. The target interrupt interface 6 then sends the interrupt signal INT to the corresponding processor 4. In response, the processor 4 reads the interrupt acknowledge register 8 of the interface 6 to indicate that it is available for servicing the interrupt. As the processor 4 has indicated that it is available, the interface 6 issues an ownership request 22 to the distributor 10. The distributor 10 selects this processor for servicing the interrupt and sends an ownership confirmation 24 to the interface 6. In response to the ownership confirmation 24, the interface 6 issues a response 28 to the read of the interrupt acknowledge register 8, including the interrupt identifying data, so that the processor 4 can begin handling the interrupt.

In FIG. 3B, the data exchange proceeds in the same way as FIG. 3A up to the interface 6 issuing an ownership request 22 to the distributor 10. In this case, the processor is not selected for servicing the interrupt and so an ownership rejection 26 is sent to the interface 6. To indicate that the processor 4 should not service the interrupt, the interface 6 sends a spurious instruction acknowledge register response 29 to the processor 4, as well as acknowledging the ownership rejection to the distributor 10. The spurious instruction acknowledge register response contains a value indicating that the interrupt should not be acted upon.

As shown in FIGS. 3A and 3B, since the interface 6 issues the interrupt signal INT to the processor 4 before the distributor has determined which processor should service the interrupt request, both the selected processor 4 of FIG. 3A and the non-selected processor 4 of FIG. 3B remain idle for a period between reading the interrupt acknowledge register and receiving the register read response 28, 29 from the interrupt interface 6 indicating whether the processor has been selected or not. This is particularly significant in the case of FIG. 3B, since this processor has not been selected for servicing the interrupt and so interrupting the processing of this processor was unnecessary. If many different processors 4 issue an ownership request then there will be many non-selected processors which will interrupt their processing and remain idle for a period while ownership of the interrupt is being determined, greatly impacting the processor performance.

To address this problem, the present technique recognises that it is not necessary to issue the interrupt signal to the processor 4 in order to determine which processor should service the interrupt. Instead, an estimation of whether the processor could accept the interrupt can be made by the interface 6, and the interface 6 can speculatively send an interrupt ownership request if the processor is estimated to be available, without actually sending the interrupt signal to the processor 4 to check whether the processor is available. The interrupt distributor 10 may then determine which of the processors for which interrupt ownership requests have been received should service the interrupt. The interface 6 corresponding to the selected processor 4 may wait until receiving the ownership confirmation from the interrupt distributor 10 before issuing the interrupt signal to the corresponding processor 4.

Figure 4A:
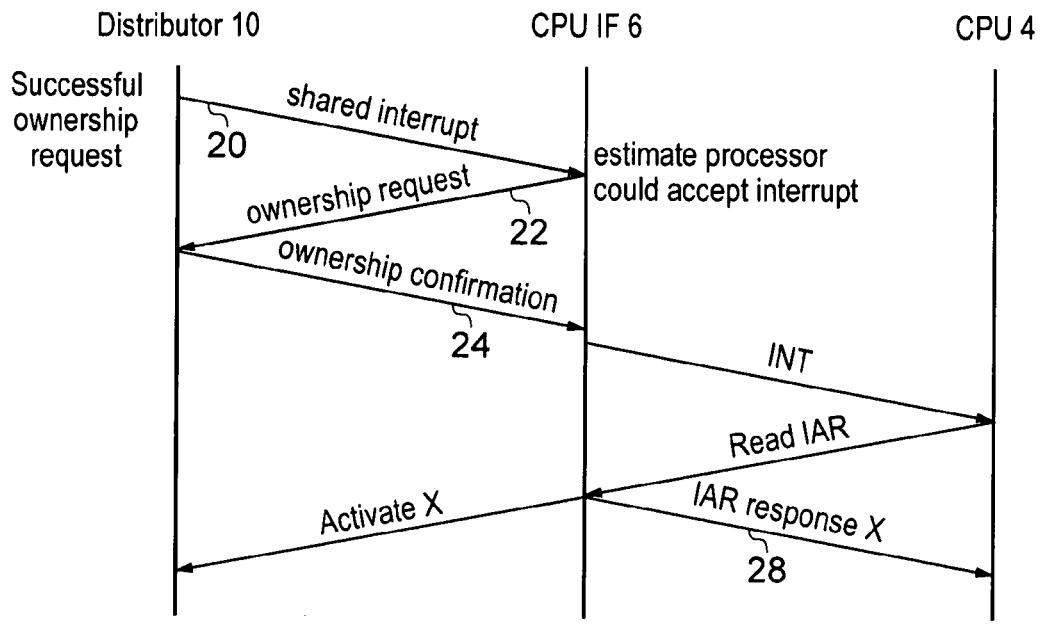
FIGS. 4A and 4B illustrates an interrupt handling scheme in which ownership of a shared interrupt request is determined before passing the interrupt request to the processor selected to service the interrupt request.
Figure 4B:
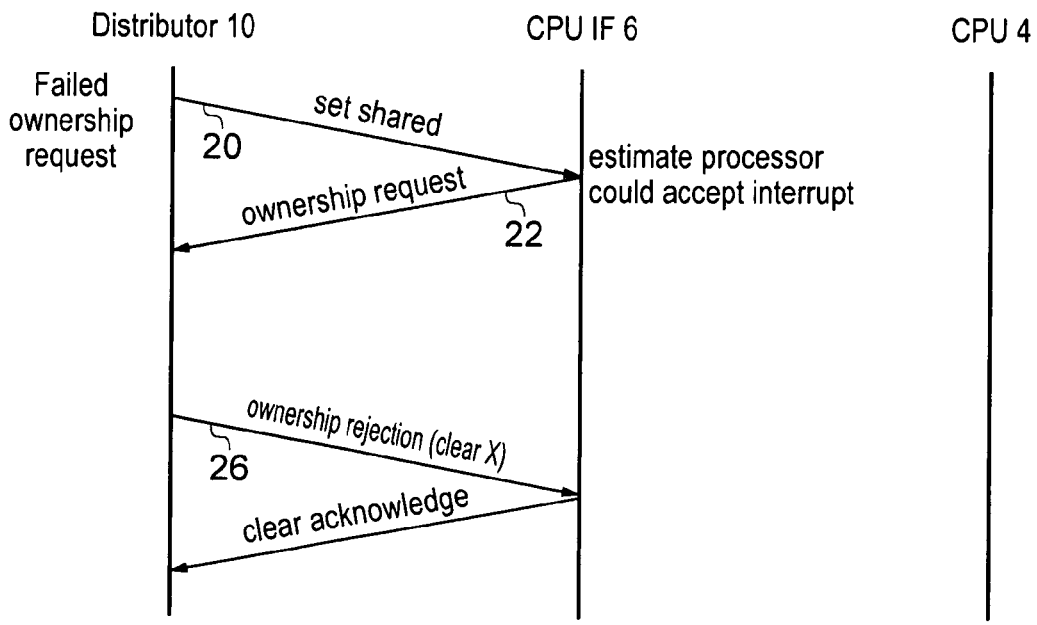

This technique is shown in FIGS. 4A and 4B. FIG. 4A illustrates the exchange of information between the distributor 10, the interface 6 and the processor 4 for the processor which is selected to service the interrupt. First, the distributor 10 sends the shared interrupt request 20 to the interface 6. The interface 6 estimates whether the processor can accept the interrupt. The estimate may be performed initially when the interrupt request is received, and/or periodically while the interrupt is pending. If the interface 6 estimates that the processor cannot accept the interrupt, then no ownership request is sent to the distributor 10. However, in the example FIG. 4A it is estimated that the processor can accept interrupts and so the ownership request 22 is sent to the distributor 10. The distributor 10 issues an ownership confirmation 24 to the interface 6 to indicate that the corresponding processor 4 has been selected for servicing the interrupt. In response to the ownership confirmation 24, the interface 6 issues the interrupt signal INT to the processor 4. In response to the interrupt signal, the processor 4 reads the interrupt acknowledge register 8 of the interface 6. In response to the instruction acknowledge register read, the interface 6 returns the interrupt identifying data in an instruction acknowledge register response 28 and also indicates to the distributor 10 that the interrupt is active and is being handled by the processor 4. Since the processor 4 is only sent the interrupt signal INT after the distributor 10 has already selected the processor for servicing the interrupt, there is no idle period while ownership of the interrupt is being determined The processor can continue with its current processing until the point at which it reads the interrupt acknowledge register 8 to signal that it can service the interrupt.

FIG. 4B shows a corresponding example in the case where a processor 4 is not selected to service the interrupt. In this case, when the interface 6 estimates that the processor can accept the interrupt, and issues an ownership request 22 to the distributor 10, the distributor 10 does not select this processor for servicing the interrupts. Hence, an ownership rejection 26 is issued to the interface 6. In response to the ownership rejection 26 the interface 6 prevents the interrupt signal being sent to the processor 4 and acknowledges the ownership rejection. Hence, processors which are not selected for servicing the interrupts do not receive the interrupt signal INT and so do not need to halt their current processing. Since often there will be several non-selected processors, then by preventing interruptions to the processing being performed by the non-selected processors, performance can be improved significantly.

To allow the interface 6 to estimate whether the corresponding processor could accept the interrupt, the interface 6 may have access to a subset of the processor state of the corresponding processor 4. Typically the subset of processor state will include information which would enable the interface 6 to determine that the processor 4 definitely cannot service the interrupt. If the processor state does not rule out servicing of the interrupt, then the interface 6 assumes that the processor 4 could service the interrupt and so an ownership request is issued to the interrupt distributor 10 without the processor 4 attempting to service the interrupt.

Figure 5:
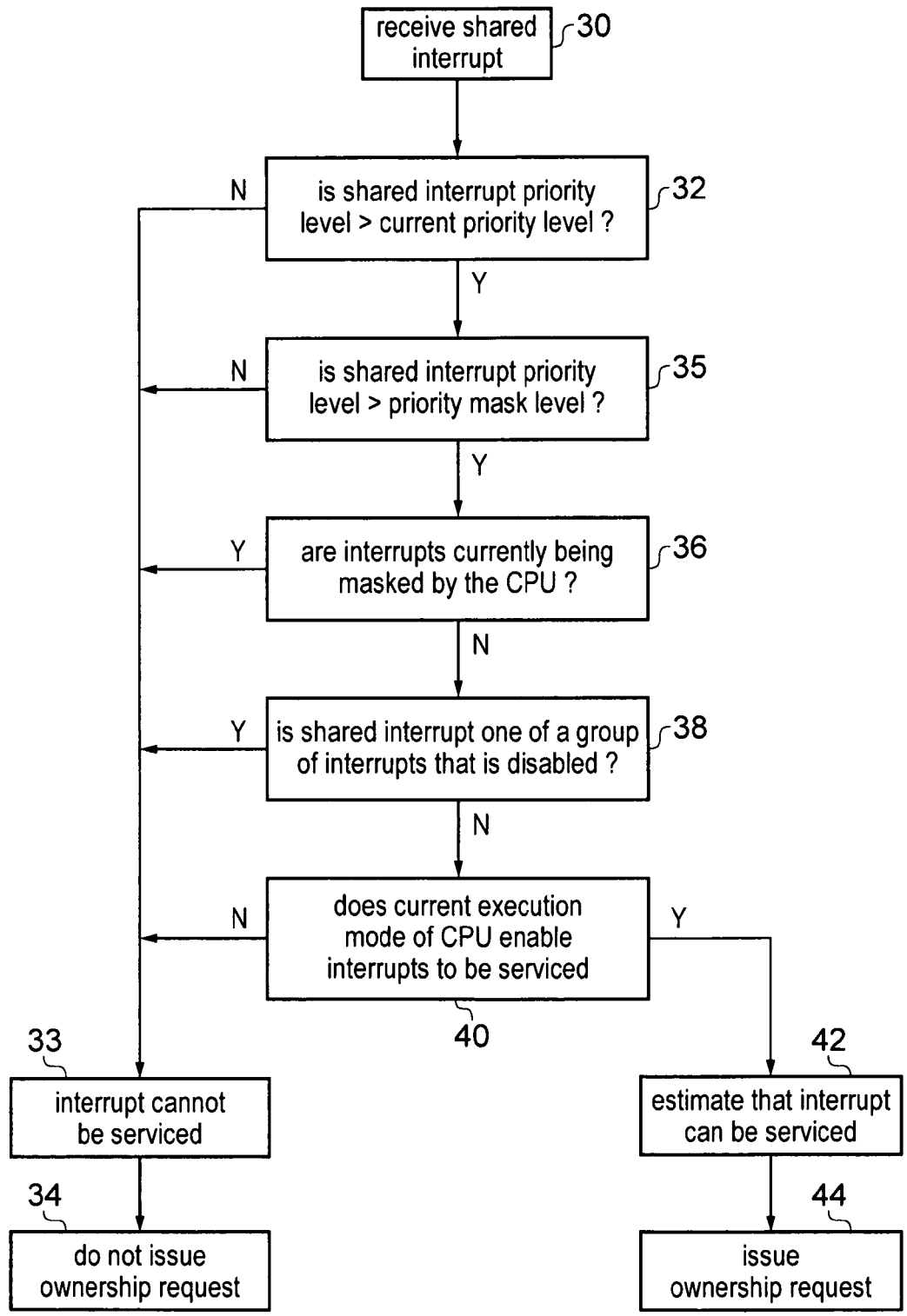
FIG. 5 shows a method of estimating, based on a subset of processor state, whether a corresponding processor is available for servicing a shared interrupt request.

FIG. 5 shows an example of a method of estimating whether a corresponding processor could accept the shared interrupts based on a subset of processor state. The processor state which the interrupt interface 6 can access includes a current priority level of the processing being performed by the processor 4, a priority mask level, an indication of whether interrupts are being masked by the processor 4, information identifying whether groups of interrupts are disabled or enabled, and a current execution mode of the processor 4.

At step 30, a shared interrupt request is received by the interface 6. At step 32, the interface checks whether the shared interrupt request has a higher priority than the current processing being performed by the processor 4. If not, then at step 33 it is estimated that the interrupt cannot be serviced and at step 34 no ownership request is issued to the distributor 10. On the other hand, if the shared interrupt priority level is greater than the current priority level then the method proceeds to step 35. At step 35 the interface 6 checks whether the shared interrupt priority level is greater than the priority mask level. If not, then again at steps 33 and 34 the interrupt cannot be serviced and so no ownership request is issued. If the shared interrupt priority level is greater than the priority mask level then at step 36 it is determined whether interrupts are currently being masked by the corresponding processor 4. If so, then at steps 33 and 34 the interrupt cannot be serviced. If interrupts are not being masked, then at step 38 it is detected whether the shared interrupt request is one of a group of interrupt requests that is currently disabled. If so, then at step 33 the interrupt cannot be serviced and so no ownership request is issued at step 34. If the group of interrupts including the shared interrupt is not disabled then at step 40 it is detected whether the current execution mode of the processor 4 enables interrupts to be serviced. If not then again at step 33 the interrupt cannot be serviced. If at step 40 the current execution mode of the processor 4 does enable interrupts to be serviced, then at step 42 it is estimated that the interrupt can be serviced and at step 44 an ownership request for the interrupt is issued to the distributor 10.

If no ownership request has yet been issued and the interrupt remains pending, then the checks shown in FIG. 5 may be repeated periodically, in case the processor state changes so that it is now estimated that the interrupt can be serviced. This may continue until either the interrupt interface requests ownership of the interrupt and acknowledges the interrupt to the distributor, or the distributor clears the interrupt so that is no longer pending for that interface (e.g. by issuing an ownership rejection 26 if another interface has requested ownership).

In summary, steps 32, 35, 36, 38, 40 of FIG. 5 represent several checks to see whether there is any reason why the processor 4 cannot service the shared interrupt request. If any of these checks fails, then at step 33 the interrupt interface 6 estimates that the processor 4 cannot service the shared interrupt request, and so no ownership request is issued at step 34. On the other hand, if none of these checks rule out servicing of the interrupt, then it is predicted that the processor could service the interrupts at step 42 and so an ownership request is issued at step 44. It will be appreciated that the different tests performed in steps 32, 35, 36, 38, 40 can be performed in any order, and that not all of the checks need to be performed. Different combinations of the checks may be provided. Other types of processor state could also be used to make the prediction of whether the interrupt could be serviced.

While steps 32 and 35 of FIG. 5 assume that an interrupt with a higher value of the priority level is more important than an interrupt with a lower value of the priority level (e.g. priority level 3 is more important than priority level 2), it is also possible for the smallest priority values to indicate the most important interrupts (e.g. priority level 0 may be more important than priority level 1). If the smallest priority value represents the most important interrupt, then at step 32 the method would proceed to step 35 if the shared interrupt priority level is less than the current priority level, and would proceed to step 33 otherwise. Similarly, at step 35 the method would proceed to step 36 if the shared interrupt priority level is less than the priority mask level, and would proceed to step 33 otherwise. In this application, the terms "higher priority" and "lower priority" refer to the importance of the interrupt, irrespective of which numeric values are used to represent this importance in terms of a priority value.

The interface 6 will not typically have access to all the information which would allow a completely accurate determination of whether the processor could handle the interrupt. Therefore, it is possible that the estimation turns out to be incorrect. Also, even if the estimation made by the interface 6 was initially correct, the processor 4 may change state after the prediction has been made, so that after it has been selected for servicing the interrupt the processor decides that it cannot service the interrupt. Therefore, the present technique also provides a mechanism for allowing a processor 4 which has been selected to service the interrupt to relinquish ownership of the interrupt. In this case, then the corresponding interface 6 may issue an ownership release indication to the distributor 10, which may then allow another processor 4 to service the interrupt.

Figure 6:
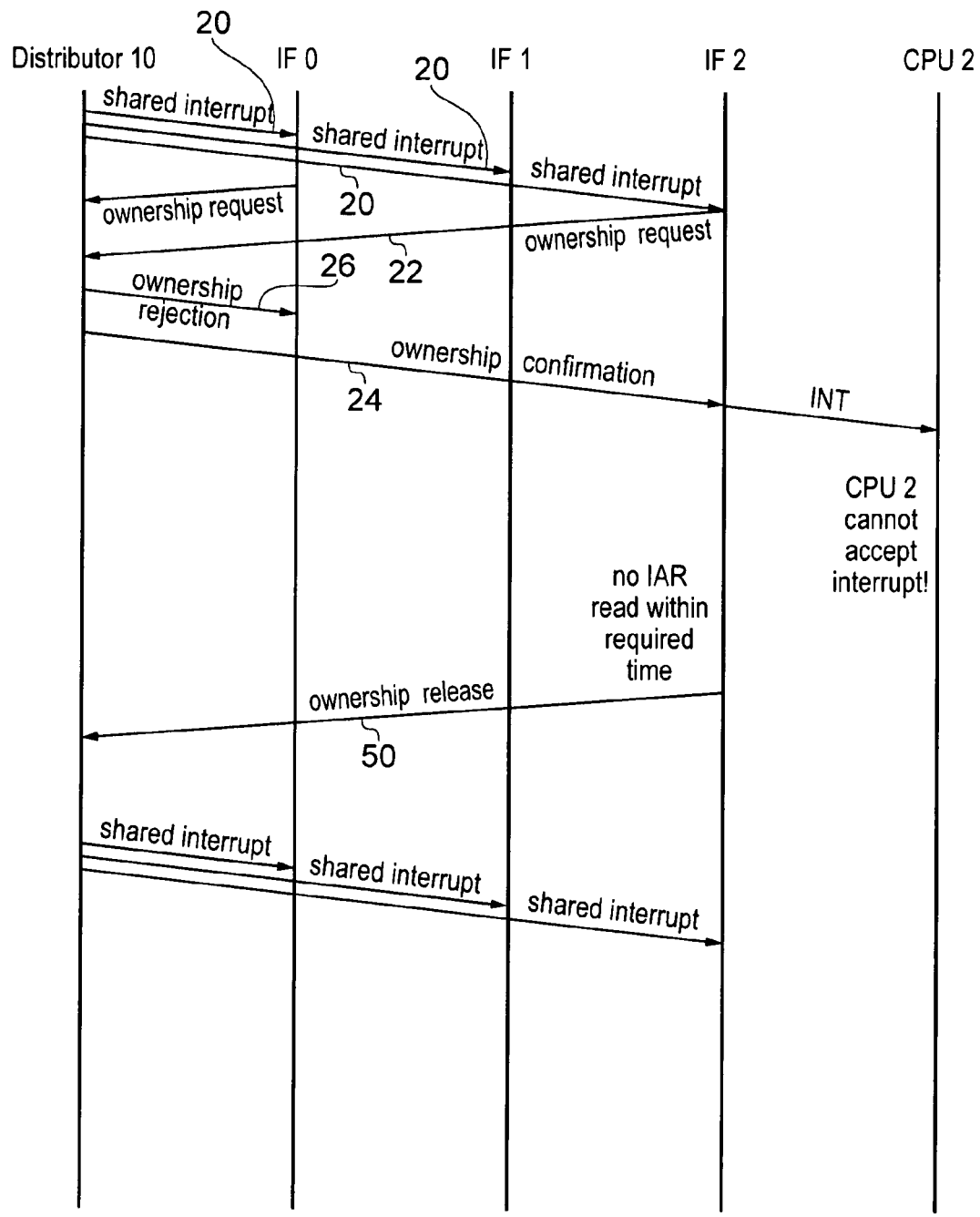
FIG. 6 illustrates an example of releasing ownership of a shared interrupt request if the selected processor cannot accept the interrupt.

FIG. 6 shows an example in which, after selecting processor CPU2 for servicing the interrupt, the processor CPU2 finds that it cannot accept the interrupt. For example, the processor may have changed states so that is now in a secure mode in which the processor is not allowed to process a non-secure interrupt. As the processor CPU2 cannot accept the interrupt, the processor CPU2 does not read the interrupt acknowledge register 8 of the corresponding interface IF2. If no interrupt acknowledge register (IAR) read occurs within a given time, then the interface IF2 issues an ownership release indication 50 to the distributor 10. The distributor 10 then allows other processor 4 to service the interrupt. In the example FIG. 6, the distributor 10 does this by reissuing the shared interrupt so that the ownership process is restarted or resumed. In other examples, the distributor 10 could re-issue the shared interrupt only to the interfaces IF0, IF2 which previously issued an interrupt ownership request. Alternatively, the distributor 10 could respond to the ownership release indication 50 by waiting to see whether any other interfaces 6 which have not yet responded to the original shared interrupt signal provide an ownership request. Alternatively, if at least one ownership rejection 26 is deferred in response to the original interrupt, then the distributor 10 could respond to the ownership release signal 50 by providing an ownership confirmation to any interface which has submitted an ownership request but for which an ownership rejection has not yet been sent. Therefore, there are many ways in which, after releasing ownership from one processor, other processors can be allowed to service the interrupts.

There may also be other ways in which the interrupt interface 6 can determine that the selected processor 4 will not be able to service the interrupt and so ownership of the interrupt should be released. FIG. 6 shows an example in which the ownership release signal 50 is issued if no instruction acknowledge register read is detected within a given time. In another example, the ownership release signal 50 may be issued if the interface 6 detects that the corresponding processor 4 has entered an interrupt service routine corresponding to the shared interrupts and then exited the interrupt service routine again without actually servicing the interrupt or initiating a read of the instruction acknowledge register 8. Entering and exiting the interrupt service routine would indicate that the processor has determined that it cannot service the interrupt. There may be other ways in which the interface 6 can determine that the interrupt will not be serviced.

Figure 7A:
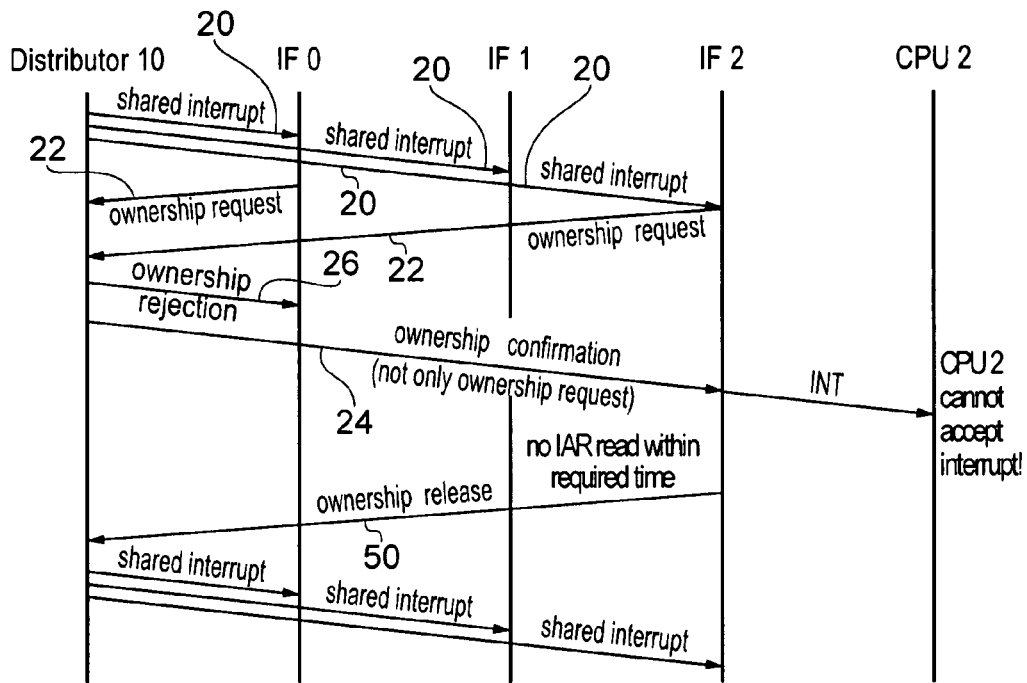
FIGS. 7A and 7B illustrate a second example of releasing ownership release of the interrupt, depending on whether the interface was the only interface to have issued an ownership request.
Figure 7B:
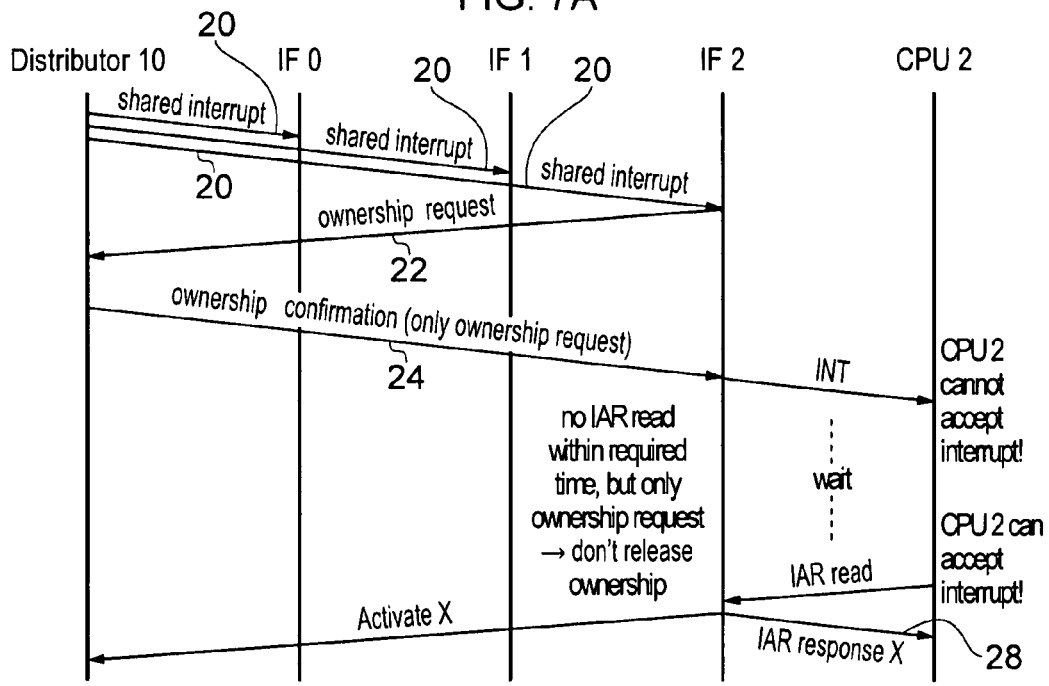

FIGS. 7A and 7B show another example of releasing ownership of an interrupt. The upper part of each Figure is similar to FIG. 6. FIGS. 7A and 7B differ from FIG. 6 in that, when issuing the ownership confirmation 24 to the selected interface, the distributor 10 also indicates whether that interface was the only interface to have issued an ownership request to the distributor 10. The interface 6 uses this information to determine whether, if the processor cannot accept the interrupt, the interface 6 should issue the ownership release indication 50.

In the example of FIG. 7A, the selected interface IF2 was not the only interface which issued an ownership request 22, because interface IF0 also issued an ownership request 22. The distributor 10 signals this to the selected interface IF2, for example by including a flag in the ownership confirmation with a value indicating that the selected interface was not the only interface to have issued an ownership request. Later, when the selected interface IF2 determines that the corresponding processor CPU2 cannot service the interrupt, then the interface IF2 issues an ownership release indication 50 because at least one other processor was estimated to be able to service the interrupt. By releasing ownership when another processor was estimated to be available, it is more likely that the interrupt can be serviced more quickly. The distributor 10 may respond to the ownership release indication 50 in the various ways discussed above.

On the other hand, as shown in FIG. 7B, if the selected interface was the only interface which issued an ownership request 22, then this is signalled in the ownership confirmation 24. In this case, then even if the processor cannot accept the interrupt, the selected interface IF2 does not send an ownership release indication 50 to the distributor 10. As there are no other processors which were estimated to be able to service the interrupt, then releasing ownership would be likely to cause unnecessary processing at the interrupt distributor 10 and the other interfaces 6, and it is unlikely that this would enable the interrupt to be handled more quickly. Therefore, the interrupt remains pending for the selected processor until the processor state changes so that the interrupt can be serviced. Eventually, when the processor becomes available then it reads the interrupt acknowledge register 8 of the interface IF2. The interface IF2 then responds with the read response 28 and an acknowledgement to the distributor 10 indicating that the interrupt is now active.

Figure 8:
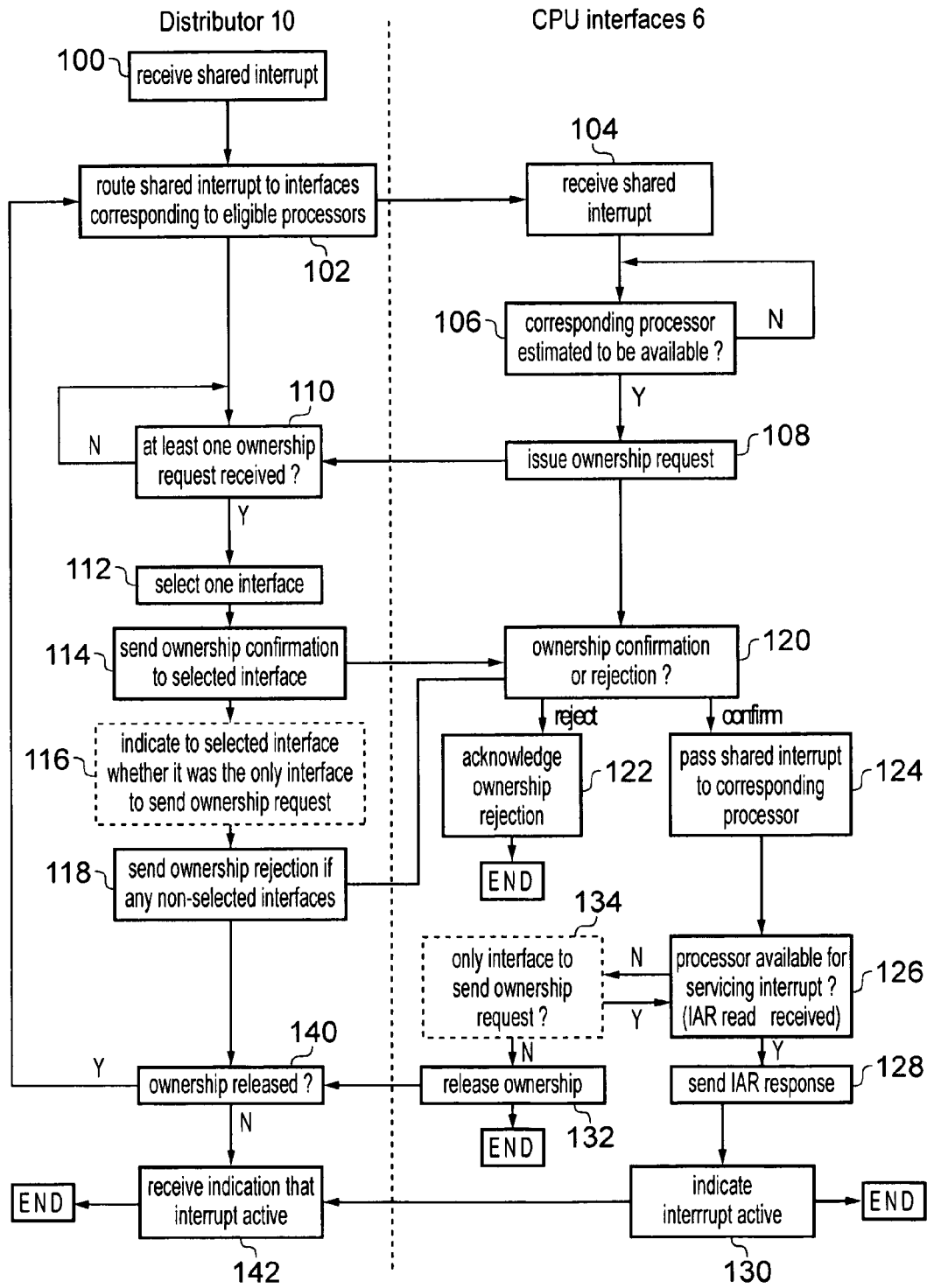
FIG. 8 illustrates a method of handling interrupts in a multi-processor system.

FIG. 8 illustrates a method of handling shared interrupt requests in a multiple processor system. The steps illustrated on the left hand side of FIG. 8 are performed at the distributor 10 while the steps illustrated on the right hand side are performed at the respective interrupt interfaces 6. At step 100, the distributor 10 receives a shared interrupt signal. At step 102, the distributor 10 routes the shared interrupt to interfaces corresponding to eligible processors 4. It is not essential for all eligible processors to receive the shared interrupt request. It may be more efficient to route the shared interrupt request to interfaces corresponding to just a subset of the available processors.

At step 104, a target interrupt interface 6 receives a shared interrupt request from the distributor 10. The target interrupt interface 6 estimates at step 106 whether the corresponding processor is likely to be available for servicing the interrupt. The estimation may be performed using a subset of processor state, as shown in FIG. 5 for example. If the target interrupt interface 6 estimates that the processor is not available, then the interface 6 waits until the processor 4 is estimated to be available. If the interface 6 estimates that the corresponding processor 4 is available, then the interface 6 issues an ownership request at step 108.

At step 110, the distributor 10 detects whether any ownership requests have been received from the interfaces 6. If not, then the distributor 10 continues waiting for an ownership request. When at least one ownership request is received, then at step 112 the distributor 10 selects one of the interfaces 6 from which an ownership request has been received. For example, the distributor 10 may select the interface 6 from which the first ownership request has been received. At step 114 an ownership confirmation is sent to the selected interface 6. Optionally, at step 116 the distributor 10 may indicate to the selected interface 6 whether it was the only interface to send an ownership request. If there are any other interfaces 6 from which an ownership request was received, but which have not been selected at step 112, then at step 118 an ownership rejection is sent to these interfaces 6.

Meanwhile, at step 120 the target interrupt interface 6 checks whether it has received an ownership confirmation or ownership rejection from the distributor 10. If an ownership rejection is received, then at step 122 the interface 6 acknowledges the rejection and the method then ends for that interface. On the other hand, if an ownership confirmation is received, then at step 124 the target interrupt interface 6 passes the shared interrupt request to the corresponding processor 4. At step 126, the interface 6 checks whether the processor 4 is available for servicing the interrupt (for example, the interface 6 detects whether a read of the interrupt acknowledge register 8 has occurred). If the processor 4 is available for servicing the interrupt, then at step 128 a response to the interrupt acknowledge register read is sent, and at step 130 the interface 6 indicates the distributor 10 that the interrupt is now active and is being processed via the corresponding processor 4.

On the other hand, if the corresponding processor 4 is not available for servicing the interrupt, then the interface 6 may release ownership of the interrupt at step 132. The interface 6 may detect that the corresponding processor 4 is not available for servicing the interrupt if, for example, no read of the interrupt acknowledge register 8 is detected within a given time, or if the processor 4 enters and exits an interrupt service routine without servicing the interrupt. Optionally, if an indication of whether the interface 6 was the only interface 6 to issue an ownership request was provided by the distributor 10 at step 116, then the interface 6 may check at step 134 whether it was the only interface and may only proceed to release ownership at step 132 if the interface 6 was not the only interface which sent an ownership request (if ownership is not released, then the method may return to step 126 to await servicing of the interrupt by the processor 4). At step 140 the distributor 10 may check whether an ownership release indication has been received. If so, the distributor 10 may reissue the interrupt at step 102 or may otherwise allow another processor to service the interrupt. Eventually, at step 142 an indication that the interrupt is active is received from one of the target interrupt interfaces 6, and then the method ends at the distributor 10.

Figure 9:
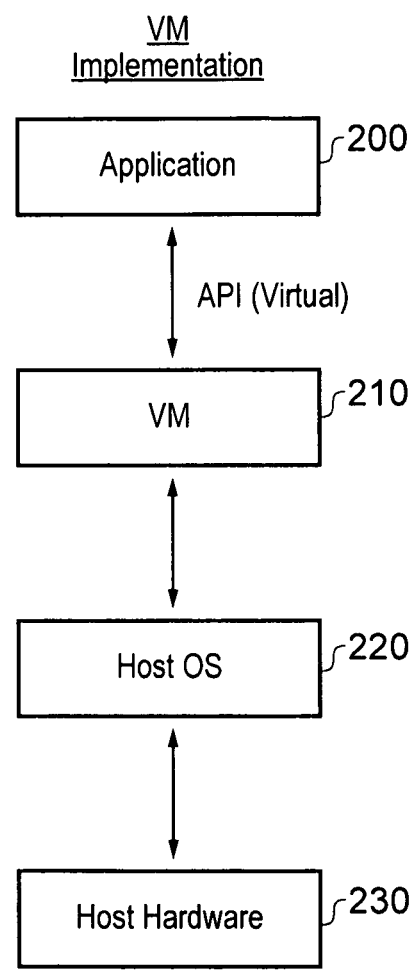
FIG. 9 illustrates a virtual machine implementation of an embodiment of the present technique.

FIG. 9 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 230 running a host operating system 220 supporting a virtual machine program 210. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 210 provides an application program interface to an application program 200 which is the same as the application program interface which would be provided by the real hardware which is the device being modelled by the virtual machine program 210. Thus, program instructions may be executed from within the application program 200 using the virtual machine program 210 to model their interaction with the virtual machine hardware. Similarly, the virtual machine program 210 may respond to shared interrupt requests in the way discussed above, as if a real apparatus was responding to the interrupt requests.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A data processing apparatus comprising:
a plurality of processors;
a plurality of interrupt interfaces each configured to handle interrupt requests for a corresponding processor; and
an interrupt distributor configured to control routing of the interrupt requests to the plurality of interrupt interfaces for the corresponding processors, the interrupt requests including a shared interrupt request which is serviceable by multiple processors;
wherein in response to the shared interrupt request, a target interrupt interface corresponding to one of the multiple processors is configured to issue an interrupt ownership request to the interrupt distributor, without passing the shared interrupt request to the corresponding processor, if the target interrupt interface estimates that the corresponding processor is available for servicing the shared interrupt request, wherein said target interrupt interface is one of said plurality of interrupt interfaces; and
the target interrupt interface is configured to pass the shared interrupt request to the corresponding processor in response to an ownership confirmation from the interrupt distributor indicating that the corresponding processor has been selected for servicing the shared interrupt request;
the target interrupt interface is configured to provide an ownership release indication to the interrupt distributor if, after passing the shared interrupt request to the corresponding processor, the corresponding processor cannot service the shared interrupt request; and
the selected interrupt interface is configured to issue the ownership release indication if, after passing the shared interrupt request to the corresponding processor, the corresponding processor enters an interrupt service routine corresponding to the shared interrupt signal and exits the interrupt service routine without servicing the shared interrupt request.

2. The data processing apparatus according to claim 1, wherein in response to the shared interrupt request, the interrupt distributor is configured to route the shared interrupt request to target interrupt interfaces corresponding to at least some of the multiple processors; and
each target interrupt interface which receives the shared interrupt request is configured to estimate whether the corresponding processor is available for servicing the shared interrupt request, and if so, to issue the interrupt ownership request to the interrupt distributor.

3. The data processing apparatus according to claim 1, wherein in response to receiving an interrupt ownership request from at least one target interrupt interface, the interrupt distributor is configured to select a target interrupt interface from which an interrupt ownership request has been received, and to issue the ownership confirmation to the selected target interrupt interface.

4. The data processing apparatus according to claim 3, wherein the interrupt distributor is configured to select as the selected target interrupt interface the target interrupt interface from which the first interrupt ownership request is received.

5. The data processing apparatus according to claim 1, wherein in response to receiving an interrupt ownership request from more than one target interrupt interface, the interrupt distributor is configured to issue an ownership rejection to at least one non-selected target interrupt interface indicating that the corresponding processor has not been selected for servicing the shared interrupt request.

6. The data processing apparatus according to claim 5, wherein in response to receiving the ownership rejection, the at least one non-selected target interrupt interface is configured to prevent the shared interrupt request being passed to the corresponding processor.

7. The data processing apparatus according to claim 1, wherein the target interrupt interface is configured to estimate whether the corresponding processor is available for servicing the shared interrupt request without the corresponding processor attempting to service the shared interrupt request.

8. The data processing apparatus according to claim 1, wherein the target interrupt interface has access to a subset of processor state of the corresponding processor; and
the target interrupt interface is configured to estimate, based on the subset of processor state, whether the corresponding processor is available for servicing the shared interrupt request.

9. The data processing apparatus according to claim 8, wherein the subset of processor state includes at least one of:
(i) a current priority level of a task or interrupt being processed by the corresponding processor;
(ii) a priority mask level, wherein interrupt requests having a lower priority than the priority mask level cannot be serviced by the corresponding processor;
(iii) an indication of whether interrupts are masked by the corresponding processor;
(iv) an indication of whether at least one group of interrupts are enabled or disabled by the corresponding processor;
(v) a current execution mode of the corresponding processor; and
(vi) the number of interrupts of a higher priority active for the corresponding processor.

10. The data processing apparatus according to claim 8, wherein the target interrupt interface is configured to issue the interrupt ownership request to the interrupt distributor if the subset of processor state does not indicate that the corresponding processor cannot service the interrupt.

11. The data processing apparatus according to claim 1, wherein in response to the ownership release indication, the interrupt distributor is configured to allow another processor to service the shared interrupt request.

12. The data processing apparatus according to claim 1, wherein the target interrupt interface is configured to issue the ownership release indication if, after passing the shared interrupt request to the corresponding processor, the corresponding processor does not service the shared interrupt request within a predetermined time.

13. The data processing apparatus according to claim 1, wherein each interrupt interface comprises an interrupt acknowledge register configured to store interrupt identifying data relating to the shared interrupt request passed to the corresponding processor; and in response to receiving the shared interrupt request from the target interrupt interface, the corresponding processor is configured to read the interrupt identifying data from the interrupt acknowledge register if the corresponding processor is available for servicing the shared interrupt request.

14. A computer-readable storage medium storing a computer program which, when executed on a computer, causes the computer to act as a virtual machine corresponding to the data processing apparatus of claim 1.

15. A data processing apparatus comprising:
a plurality of processors;
a plurality of interrupt interfaces each configured to handle interrupt requests for a corresponding processor; and
an interrupt distributor configured to control routing of the interrupt requests to the plurality of interrupt interfaces for the corresponding processors, the interrupt requests including a shared interrupt request which is serviceable by multiple processors;
wherein in response to the shared interrupt request, a target interrupt interface corresponding to one of the multiple processors is configured to issue an interrupt ownership request to the interrupt distributor, without passing the shared interrupt request to the corresponding processor, if the target interrupt interface estimates that the corresponding processor is available for servicing the shared interrupt request, wherein said target interrupt interface is one of said plurality of interrupt interfaces; and
the target interrupt interface is configured to pass the shared interrupt request to the corresponding processor in response to an ownership confirmation from the interrupt distributor indicating that the corresponding processor has been selected for servicing the shared interrupt request;
the target interrupt interface is configured to provide an ownership release indication to the interrupt distributor if, after passing the shared interrupt request to the corresponding processor, the corresponding processor cannot service the shared interrupt request;
the interrupt distributor is configured to indicate to the target interrupt interface whether the target interrupt interface is the only interrupt interface to have issued an interrupt ownership request to the distributor in response to the shared interrupt request; and
the target interrupt interface is configured to suppress issuing of the ownership release indication if the interrupt distributor indicates that the target interrupt interface is the only interrupt interface to have issued an interrupt ownership request.

16. A data processing apparatus comprising:
a plurality of processing means for processing data;
a plurality of interrupt interface means for handling interrupt requests for a corresponding processing means; and
an interrupt distributing means for controlling routing of the interrupt requests to the plurality of interrupt interface means for the corresponding processing means, the interrupt requests including a shared interrupt request which is serviceable by multiple processing means;
wherein in response to the shared interrupt request, a target interrupt interface means corresponding to one of the multiple processing means is configured to issue an interrupt ownership request to the interrupt distributing means, without passing the shared interrupt request to the corresponding processing means, if the target interrupt interface means estimates that the corresponding processing means is available for servicing the shared interrupt request, wherein said target interrupt interface means is one of said plurality of interrupt interface means; and
the target interrupt interface means is configured to pass the shared interrupt request to the corresponding processing means in response to an ownership confirmation signal from the interrupt distributing means indicating that the corresponding processing means has been selected for servicing the shared interrupt request;
the target interrupt interface means is configured to provide an ownership release indication to the interrupt distributing means if, after passing the shared interrupt request to the corresponding processing means, the corresponding processing means cannot service the shared interrupt request; and
the selected interrupt interface means is configured to issue the ownership release indication if, after passing the shared interrupt request to the corresponding processing means, the corresponding processing means enters an interrupt service routine corresponding to the shared interrupt signal and exits the interrupt service routine without servicing the shared interrupt request.

17. An interrupt interface for handling interrupt requests for a corresponding processor of a data processing apparatus having a plurality of processors; wherein:
in response to a shared interrupt request which is serviceable by multiple processors including the processor corresponding to the interrupt interface, the interrupt interface is configured to estimate whether the corresponding processor is available for servicing the shared interrupt request;
the interrupt interface is configured to issue an interrupt ownership request to an interrupt distributor, without passing the shared interrupt request to the corresponding processor, if the corresponding processor is estimated to be available for servicing the shared interrupt request; and
in response to an ownership confirmation signal from the interrupt distributor indicating that the corresponding processor has been selected for servicing the shared interrupt request, the interrupt interface is configured to pass the shared interrupt request to the corresponding processor;
the interrupt interface is configured to provide an ownership release indication to the interrupt distributor if, after passing the shared interrupt request to the corresponding processor, the corresponding processor cannot service the shared interrupt request; and
the interrupt interface is configured to issue the ownership release indication if, after passing the shared interrupt request to the corresponding processor, the corresponding processor enters an interrupt service routine corresponding to the shared interrupt signal and exits the interrupt service routine without servicing the shared interrupt request.

18. A method for handling interrupt requests in a data processing apparatus having a plurality of processors, the method performed by an interrupt interface corresponding to one of the plurality of processors and comprising the steps of:

receiving a shared interrupt request which is serviceable by multiple processors including the processor corresponding to the interrupt interface;

estimating whether the corresponding processor is available for servicing the shared interrupt request;

if the corresponding processor is estimated to be available for servicing the shared interrupt request, issuing an interrupt ownership request to an interrupt distributor, without passing the shared interrupt request to the corresponding processor; and in response to an ownership confirmation signal from the interrupt distributor indicating that the corresponding processor has been selected for servicing the shared interrupt request, passing the shared interrupt request to the corresponding processor;

providing an ownership release indication to the interrupt distributor if, after passing the shared interrupt request to the corresponding processor, the corresponding processor cannot service the shared interrupt request; and issuing the ownership release indication if, after passing the shared interrupt request to the corresponding processor, the corresponding processor enters an interrupt service routine corresponding to the shared interrupt signal and exits the interrupt service routing without servicing the shared interrupt request.

* * * * *